United States Patent [19]
Ohdoi

[11] Patent Number: 5,032,944
[45] Date of Patent: Jul. 16, 1991

[54] MEMBRANE TYPE MAGNETIC HEAD
[75] Inventor: Yuzo Ohdoi, Hyogo, Japan
[73] Assignee: Mitsubishi Denki Kabushiki Kaisha, Tokyo, Japan
[21] Appl. No.: 378,031
[22] Filed: Jul. 11, 1989
[30] Foreign Application Priority Data Jan. 12, 1989 [JP] Japan .................................. 1-5701

[51] Int. Cl.$^5$ .............................................. G11B 5/147
[52] U.S. Cl. ................................................... 360/126
[58] Field of Search ....................... 360/126, 122, 125

[56] References Cited

U.S. PATENT DOCUMENTS

| | | | |
|---|---|---|---|
| 4,219,854 | 8/1980 | Church et al. | 360/123 |
| 4,368,496 | 1/1983 | Kato et al. | 360/126 |
| 4,654,754 | 3/1987 | Daszkowski | 357/81 |
| 4,768,081 | 8/1988 | Moeller | 357/78 |
| 4,901,137 | 2/1990 | Sato et al. | 357/81 |

FOREIGN PATENT DOCUMENTS

| | | | |
|---|---|---|---|
| 0071816 | 6/1981 | Japan | 360/126 |
| 0026308 | 2/1983 | Japan | 360/125 |
| 0246907 | 12/1983 | Japan | . |
| 0110320 | 11/1984 | Japan | . |
| 0705509 | 12/1979 | U.S.S.R. | 360/126 |

Primary Examiner—A. J. Heinz
Assistant Examiner—Jefferson Evans
Attorney, Agent, or Firm—Wolf, Greenfield & Sacks

[57] ABSTRACT

A membrane type magnetic head comprises, between a substrate and a protecting layer, first and second magnetic layers, an insulating gap layer at least partly interposed between the first and second magnetic layers, a coil conductor layer and resin insulating layers surrounding the coil conductor layer. Stress relaxation layers are formed on the resin insulating layers.

11 Claims, 2 Drawing Sheets

MEMBRANE TYPE MAGNETIC HEAD

BACKGROUND OF THE INVENTION

1. Industrial Field of Utilization

The present invention relates to the construction of a membrane type magnetic head for use in a magnetic disc apparatus.

2. Description of Prior Arts

FIG. 1 is a sectional view of a membrane type magnetic head according to a prior art as disclosed, for example, in Japanese Patent Laid-Open No. 61-110320. In FIG. 1, numeral 1 designates a substrate made of $Al_2O_3$-TiC, etc., numeral 2 a lower magnetic layer formed on said substrate 1 in a predetermined pattern and made of Ni, Fe, etc., numeral 3 an insulating gap layer formed on said lower magnetic layer 2 and made of $SiO_2$, $Al_2O_3$, etc., numeral 41 a first resin-made insulating layer formed by thermosetting resist material or the like in a specified area on the substrate 1 on which said lower magnetic layer 2 and insulating gap layer 3 have beeb formed, numeral 5 a coil conductor layer made of Cu, etc. formed in a specified pattern on said first resin insulating layer 41, numeral 42 a second resin insulating layer formed of resist material, etc., and numeral 6 an upper magnetic layer made of Ni, Fe, etc. formed in a specified pattern on the upper surface of the laminate comprising said lower magnetic layer 2, said insulating gap layer 3, said first and second resin insulating layers 41, 42 and so forth. Numeral 7 designates a protecting layer formed on said upper magnetic layer 6 and the associated second resin insulating layer 42 and is made of $SiO_2$, $Al_2O_3$ or the like.

The operation of said prior art magnetic head will next be explained. In a magnetic disc apparatus, when information is written on a magnetic disc representing the magnetic recording medium, signal current is caused to flow through the coil conductor layer 5 of a membrane type magnetic head to generate magnetic flux to pass through the lower magnetic layer 2 and upper magnetic layer 6. When the magnetic disc is placed near the leakage flux formed at the tip and portion (or the extreme lefthand portion of the drawing) of the lower magnetic layer 2 and the upper magnetic layer 6 which sandwich the insulating gap layer 3, the magnetic layer of the magnetic disc is magnetized in accordance with the direction and the intensity of the leakage flux of said membrane type magnetic head so that information may be recorded. Conversely when information leaks out of the magnetic disc in which said information was recorded, the magnetic flux of the magnetic disc is picked up by the tip end of the magnetic layer of the membrane type magnetic head, and any voltage change which may occur at the opposite ends of the coil conductor layer 5 due to electromagnetic induction of the magnetic flux flowing through the lower magnetic layer 2 and the magnetic layer 6 is converted into signals which are in turn read.

In the membrane type magnetic head of prior art, various materials are laminated to form the head. The first and second resin insulating layers 41, 42 have low thermal conductivity, a high thermal expansion coefficient and a highly hygroscopic nature compared to the other layers 3, 5, 6 which are made of metallic or inorganic materials. Accordingly when the volume of the first and second resin insulating layers 41, 42 is increased due to the effect of temperature and humidity when said membrane type magnetic head is used or tested and the signal generated by current flowing through the coil conductor layer 5, the upper magnetic layer 6 and the protecting layer 7 which are formed adjacent to the first and second resin insulating layers 41, 42 will be adversely affected. In other words, when the upper magnetic layer 6 is distorted by pressure, the magnetic zone of the upper magnetic layer 6 is also distorted due to the resulting magnetic distortion effect. As a result, such problems as deterioration of the electromagnetic conversion characteristics of the membrane type magnetic head and cracking of the protecting layer 7 due to pressurization may result.

SUMMARY OF THE INVENTION

The present invention has been proposed to eliminate such problems as those described above and, according to the present invention, the electromagnetic conversion characteristics of a membrane type magnetic head will not be reduced and the protecting layer will not be degraded. It is an object of the present invention to provide a highly reliable membrane type magnetic head.

The membrane type magnetic head according to the present invention comprises a substrate, coil conductor layers formed on said substrate, resin insulating layers surrounding said coil conductor layers and a protecting layer formed on said resin insulating layer, wherein a stress relaxation layer is interposed between said resin insulating layer and said protecting layer.

According to the membrane type magnetic head provided by the present invention, even if the volume of the resin insulating layer is expanded due to thermal expansion or humidity absorption, any stress which may be imposed on said protecting layer and so forth will be relieved by said stress relaxation layer interposed between the resin insulating layer and the protecting layer.

In the membrane type magnetic head according to the present invention, a stress relaxation layer is interposed between the resin insulating layer and the protecting layer so that even if the volume of the resin insulating layer is increased by thermal expansion or humidity absorption such as to pressurize said protecting layer and the like, the pressure so created is relieved. Thus the safety level and reliability of the electromagnetic conversion characteristics of the membrane type magnetic head can be raised.

DESCRIPTION OF THE EMBODIMENT

Figure 1:
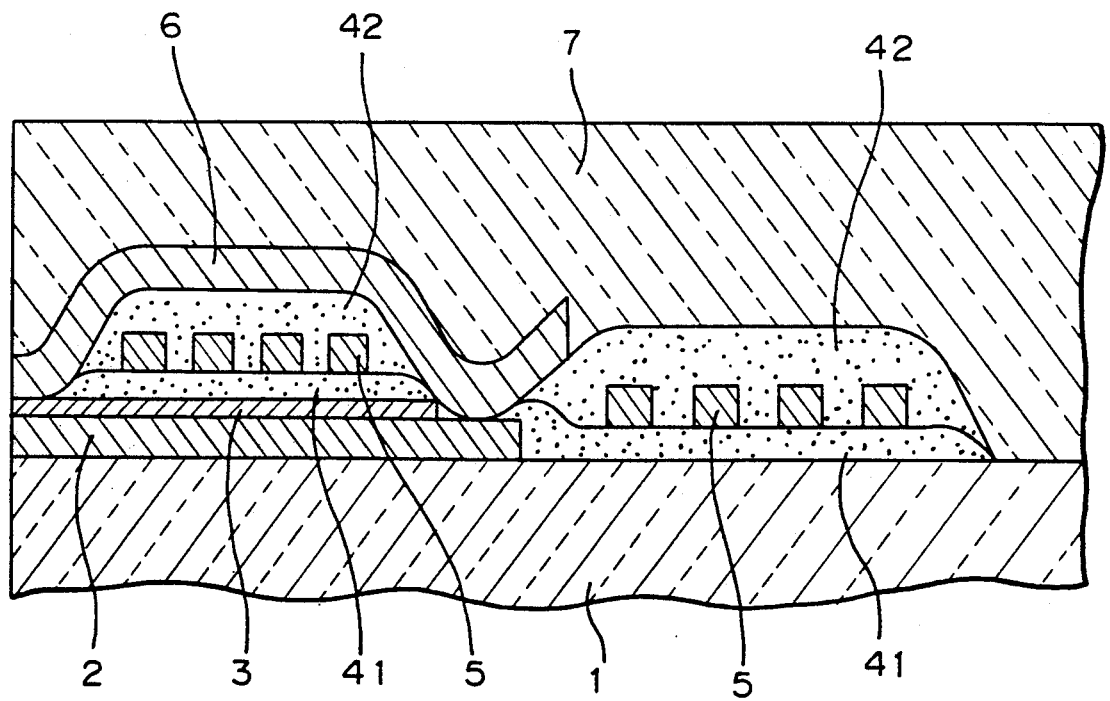
FIG. 1 is a sectional view illustrating a membrane type magnetic head according to a prior art.
Figure 2:
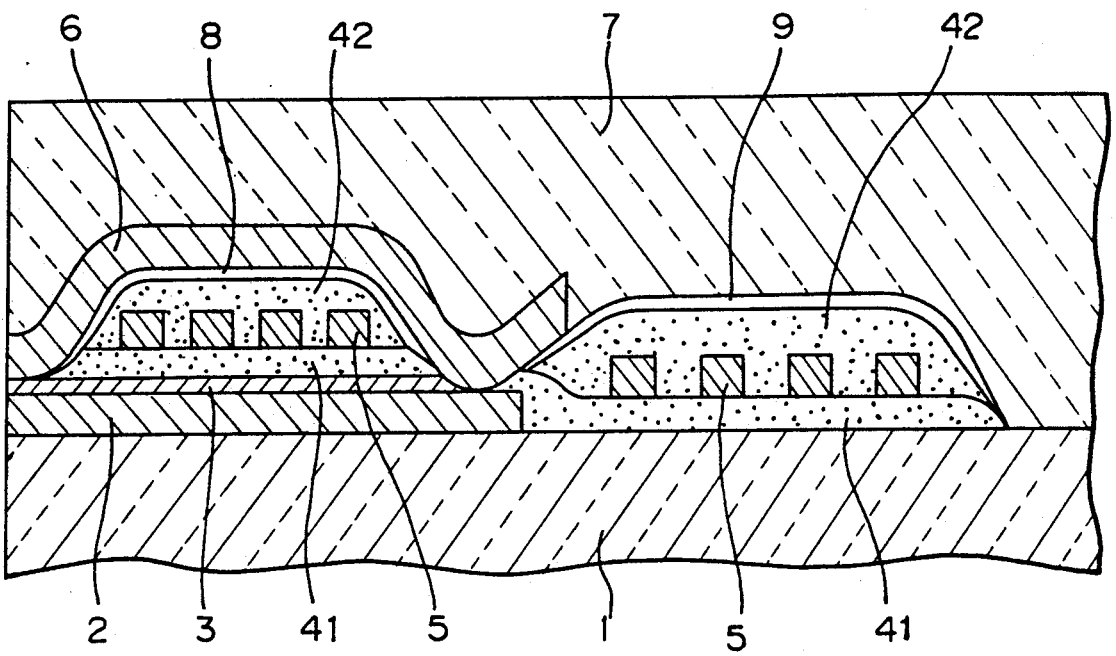
FIG. 2 is a sectional view illustrating an embodiment of the present invention.

An embodiment of the present invention will now be explained by referring to the accompanying drawings. In FIG. 2 numeral 8 designates a first stress relaxation layer interposed between a second resin insulating layer 42 and an upper magnetic layer 6, and numeral 9 designates a second stress relaxation layer interposed between the second resin insulating layer 42 and the protecting layer 7. The remaining elements are the same as in FIG. 1.

In the present embodiment, the first and second stress relaxation layers 8, 9 are provided by way of clearances.

The process of manufacturing the membrane type magnetic head described above will now be explained.

The laminate on the substrate 1 comprising the lower magnetic layer 2, the insulating gap layer 3, the first resin insulating layer 41, the coil conductor layer 5, the second resin insulating layer 42 and the upper magnetic layer 6 in that order is firstly placed in a vacuum container. After said laminate formation has been heated to a temperature of 250° C.–300° C., the protecting layer 7 is formed by a sputtering method. The laminate formation is then taken out of the vacuum container and the temperature is reduced. At this time, the volume of the first and second resin insulating layers 41, 42 which have been thermally expanded will more rapidly and substantially drop than the lower magnetic layer 2, the insulating gap layer 3, the coil conductor layer 5, the upper magnetic layer 6 and the protecting layer 7 which have also been thermally expanded. The second resin insulating layer 42 and upper magnetic layer 6 are relatively loosely contacted, as are the second resin insulating layer 42 and protecting layer 7 so the resin insulating layers 41, 42 contract more quickly, and the first stress relaxation layer 8 is therefore formed betweeen the second resin insulating layer 42 and the upper magnetic layer 6, and the second stress relaxation layer 9 is formed between the second resin insulating layer 42 and the protecting layer 7. At that time, it is also possible that the first stress relaxation layer 8 and the second stress relaxation layer 9 may both be formed.

Figure 3:
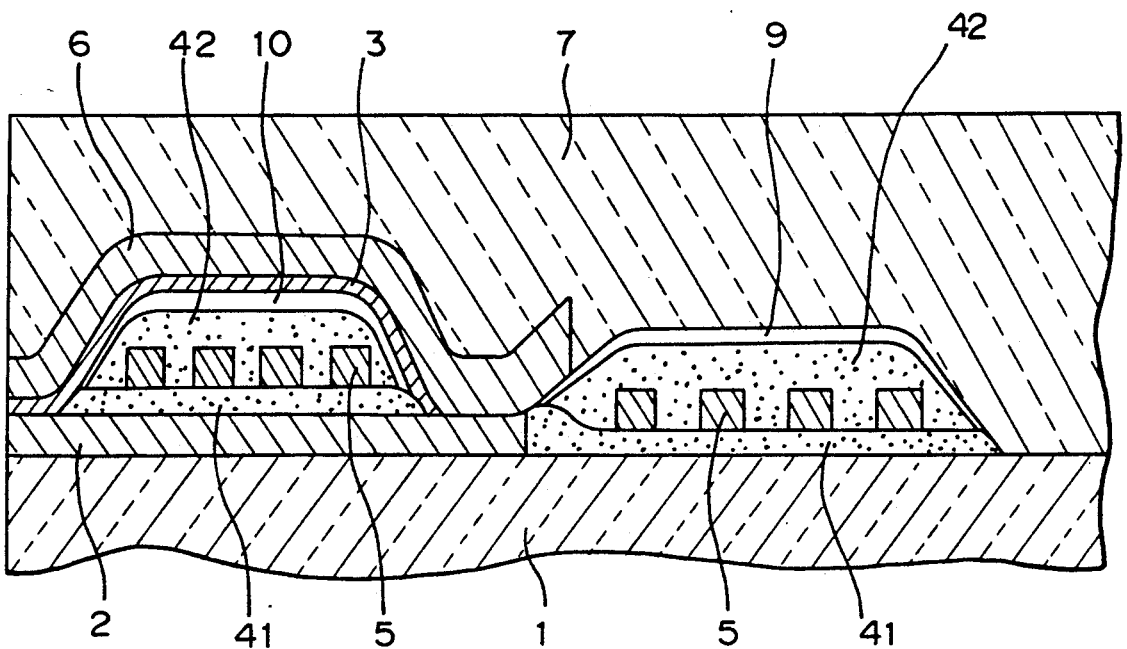
FIG. 3 is a sectional view illustrating another embodiment of the present invention.

FIG. 3 is a sectional view illustrating another embodiment of the membrane type magnetic head of the present invention. An insulating gap layer 3 is formed on the second resin insulating layer 42 and a third stress relaxation layer 10 is formed between the second resin insulating layer 42 and the insulating gap layer 3. This arrangement will provide the same effects as the embodiment explained earlier.

It is also to be noted that same effect may be attained if a rubber-like polymeric material, polymeric foam material or the like is coated on the second resin insulating layer 42 to provide first and second stress relaxation layers 8, 9 and if the upper magnetic layer 6 is formed by a plating process or the like and the protecting layer 7 by a sputtering process or the like. In this instance, even if just one of said first stress relaxation layer and second stress relaxation layer is formed, a sufficient effect can be attained.

What is claimed is:

1. A membrane type magnetic head comprising, between a substrate and a protecting layer, first and second magnetic layers, an insulating gap layer at least partly interposed between said first and second magnetic layers, a coil conductor layer and resin insulating layers surrounding said coiled conductor layer, and a stress relaxation layer adjacent said resin insulating layers, said stress relaxation layer defined by a cavity formed between said resin insulating layer and one of said magnetic layers.

2. A membrane type magnetic head as claimed in claim 1 characterized in that said stress relaxation layer is disposed between said protecting layer and said resin insulating layers.

3. A membrane type magnetic head as claimed in claim 1 characterized in that said stress relaxation layer is disposed between said first magnetic layer and said resin insulating layers.

4. A membrane type magnetic head as claimed in claim 1 characterized in that said stress relaxation layer is disposed between said insulating gap layer and said resin insulating layers.

5. In a membrane-type magnetic head having a coil conductor surrounded by a resin insulating layer, a magnetic layer at least partially surrounding said resin insulating layer a gap insulating layer intermediate said resin insulating layer and said magnetic layer, and a protective layer surrounding said insulating layer and said magnetic layer, the improvement comprising:

means, disposed intermediate said resin insulating layer and said protective layer, for relieving pressure exerted on said magnetic layer and said protective layer by said insulating layer due to expansion thereof, wherein forces exerted by said resin insulating layer on said means for relieving pressure are absorbed by said means for relieving pressure, wherein said means for relieving pressure comprises a cavity.

6. In a membrane-type magnetic head, the improvement according to claim 5, wherein said cavity is defined by said protective layer and said resin insulating layer.

7. In a membrane-type magnetic head, the improvement according to claim 5, wherein said cavity is defined by said magnetic layer and said resin insulating layer.

8. In a membrane-type magnetic head, the improvement according to claim 5, wherein said cavity is defined by said gap insulating layer and said resin insulating layer.

9. In a membrane-type magnetic head, the improvement according to any one of claims 5–8 wherein said cavity is filled with air.

10. In a membrane-type magnetic head having a coil conductor surrounded by a resin insulating layer, a magnetic layer at least partially surrounding said resin insulating layer, a gap insulating layer intermediate said resin insulating layer and said magnetic layer, and a protective layer surrounding said insulating layer and said magnetic layer, the improvement comprising:

said magnetic layer and said resin insulating layer having a stress relaxation layer defined by a cavity for preventing pressure exerted on said magnetic layer and said protective layer by said insulating layer due to expansion thereof.

11. In a membrane-type magnetic head having a coil conductor surrounded by a resin insulating layer, a magnetic layer at least partially surrounding said resin insulating layer, a gap insulating layer intermediate said resin insulating layer and said magnetic layer, said magnetic layer comprising first and second magnetic layers in combination with said gap insulating layer defining a closed magnetic circuit, and a protective layer surrounding said insulating layer and said magnetic layer, the improvement comprising:

means, disposed intermediate said resin insulating layer and said protective layer, for relieving pressure exerted on said magnetic layer and said protective layer by said insulating layer due to expansion thereof, said means for relieving pressure defined by a cavity formed between said resin insulating layer and said protective layer, said means for relieving pressure disposed at least in part within a locus defined by said magnetic circuit, wherein forces exerted by said resin insulating layer on said means for relieving pressure are absorbed by said means for relieving pressure.

* * * * *